United States Patent

[11] 3,532,202

[72] Inventors Charles S. Ochs;
    James W. Trainor, Lancaster, Ohio
[21] Appl. No. 713,246
[22] Filed March 14, 1968
[45] Patented Oct. 6, 1970
[73] Assignee Anchor Hocking Glass Corporation,
    Lancaster, Ohio
    a corporation of Delaware

[54] CLOSURE CAP ALIGNING MECHANISM
    15 Claims, 8 Drawing Figs.
[52] U.S. Cl. .................................................. 193/43,
    198/33
[51] Int. Cl. ........................................ B65g 11/20
[50] Field of Search .......................................... 193/43,
    43(A), 43(B), 43(C), 43(D); 221/158; 198/33(R)

[56] References Cited
    UNITED STATES PATENTS
    2,440,959 5/1948 Krueger ...................... 193/43(D)
    3,095,957 7/1963 Roberts et al. ................. 193/43(D)
    3,342,305 9/1967 Ochs ........................... 193/33(R)

Primary Examiner—Andres H. Nielsen
Attorney—Norman N. Holland

ABSTRACT: A mechanism for aligning closure caps so that all caps in a moving line of caps emerging from a cap feeding chute have their covers facing in the same direction for use on a cap feeding chute where the closures are fed into the chute with randomly oriented covers. The cap aligning mechanism has a revolving star wheel positioned in the cap chute including a series of cap receiving pockets. A cap inverting wheel is mounted at one side of the star wheel having arms for engaging inverted caps held in the star wheel pockets for tilting these inverted caps so that they are carried into a cap turn-over cam as they leave the star wheel. The turn-over cam has an elongated slot for receiving the edge of the tilted caps and for completing the inversion of the tilted caps as the caps move along the cap feed chute towards its outlet end.

INVENTORS
CHARLES S. OCHS
JAMES W. TRAINOR
BY
ATTORNEY

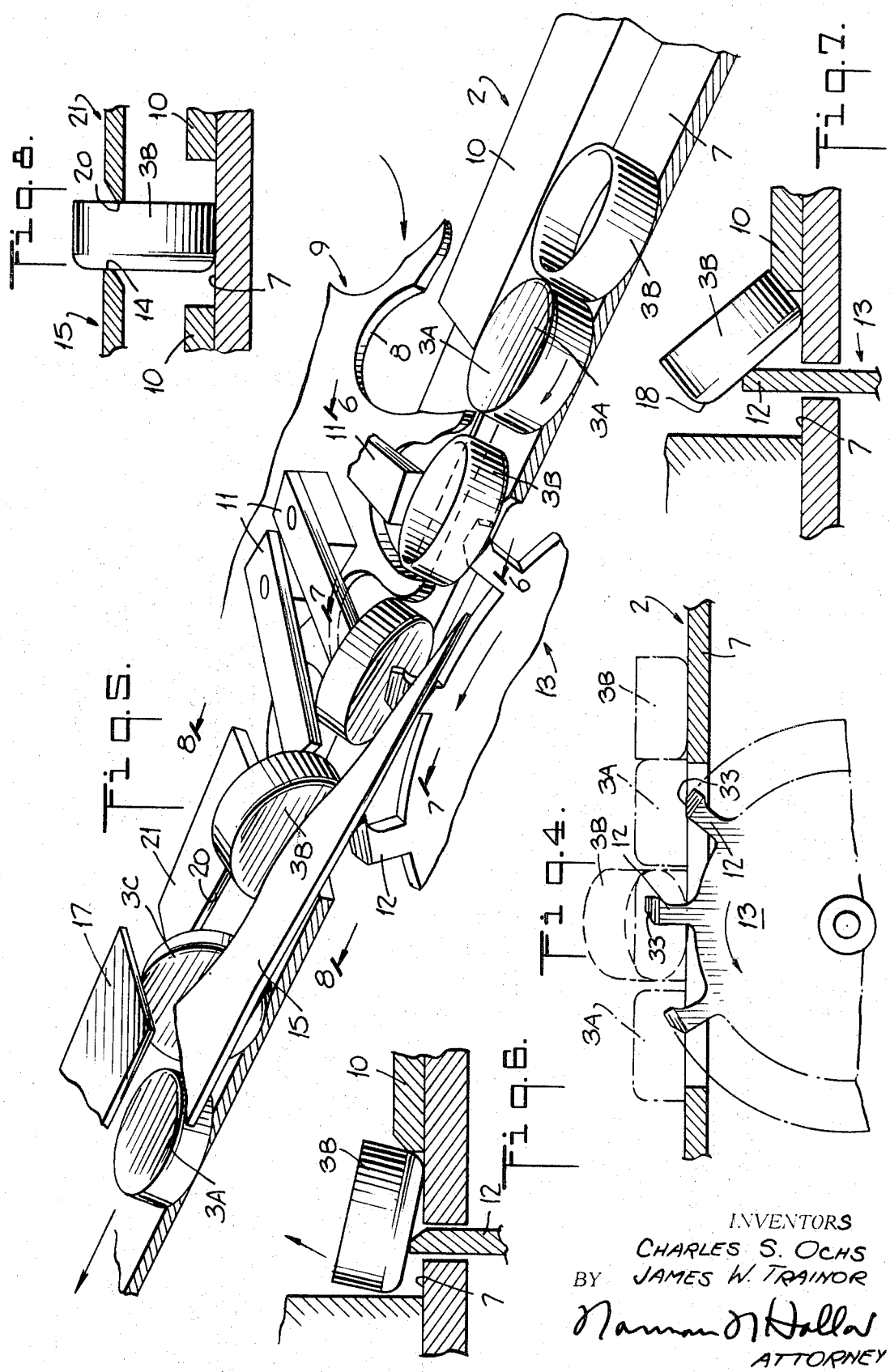

CLOSURE CAP ALIGNING MECHANISM

This invention relates to a closure cap aligning mechanism for use in a cap feeding chute and particularly for use in a cap feeding system where caps are fed with random orientation to one end of a feed chute and where the caps emerging from the outlet end of the chute must all be oriented with their covers facing in the same direction. The mechanism operates on a moving line of closure caps having random orientation and it senses those which are inverted with respect to the desired position at the feed chute outlet. The inverted caps are engaged and turned-over by the cap aligning mechanism while they retain their original position in the moving line of caps in the cap feed chute.

Various cap aligning devices have been in general use for some time and they may be broadly classified into two differing systems. In the first of the presently known systems, the uniform orientation is obtained by sensing and by diverting improperly oriented caps so that they are fed back to the cap feeding hopper or other chute feeding devices. In this type of system, only the properly oriented caps pass through the cap feed outlet so that a substantial number of the caps must be returned to the feeding hopper. This type of system thus requires additional handling of the caps and also requires a high initial cap feeding rate to compensate for the large number of improperly oriented caps which are returned to the hopper.

Additional systems in use sense improperly oriented caps and then turn these caps over without interrupting the forward movement of the caps in the cap feeding system. Among the more successful of these cap aligning devices are those operating on magnetic principles such as, for example, the cap aligning mechanisms shown in U.S. Pat. No. 3,095,957 issued to Roberts, et al. and U.S. Pat. No. 3,244,264 issued to Ochs, et al. and both owned by the assignee of the present invention. These prior devices use a rotating star wheel and a cap inverting cam where the preferred cap tilting force is magnetic. These cap aligning mechanisms are satisfactory for ferrous caps and particularly for caps of relatively large diameter, however, they do not operate effectively on caps of smaller diameter or caps having relatively deep skirts and they are also ineffective on non-ferrous caps such as aluminum and plastic caps. The cap aligning device of the present invention, on the other hand, is particularly effective for smaller diameter caps and caps having relatively deep skirts as contrasted with the cap diameter and operates effectively on all caps regardless of the cap material. The cap aligning device of the present invention also operates at a variety of cap feeding rates and is equally effective at both low and relatively high rates of cap feed.

As will be more fully described below, the cap aligning mechanism of the present invention positions a star wheel in the cap feeding chute having a series of cap receiving pockets. The moving caps rotate the star wheel and simultaneously rotate a cap tilting wheel which is positioned so that its cap tilting spokes engage the covers of inverted caps causing the caps to be tilted in the star wheel pocket and so that the raised edge of the tilted cap moves into a cap turn-over cam slot. Correctly oriented caps pass into the star wheel with their covers spaced from the arms of the turn-over wheel so that these arms do not engage the cap cover and so that these correctly oriented caps remain untilted within the star wheel pockets so that they pass out of the star wheel without having their positions changed.

Accordingly, an object of the present invention is to provide an improved cap aligning mechanism.

Another object of the present invention is to provide a cap aligning mechanism useful for caps regardless of cap material and operative on both ferrous and non-ferrous metal caps as well as plastic caps or caps of other materials.

Another object of the present invention is to provide a high speed cap aligning mechanism particularly adapted for use with smaller caps or caps having relatively deep skirts with reference to the cap diameter.

Another object of the present invention is to provide a cap aligning mechanism useful on a wide variety of cap shapes and cap materials and where improperly oriented caps have their positions sensed and corrected without being rediverted to the original cap feeding hopper.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 4 is a vertical sectional view showing the cap tilting wheel taken along line 4–4 on FIG. 3;

FIG. 5 is a perspective view illustrating the cap inverting action of a preferred embodiment of the cap aligning mechanism; and FIGS. 6, 7, and 8 are horizontal sectional views illustrating successive positions of a cap during the cap aligning action and taken along lines 6–6, 7–7, and 8–8 on FIG. 5.

Figure 1:
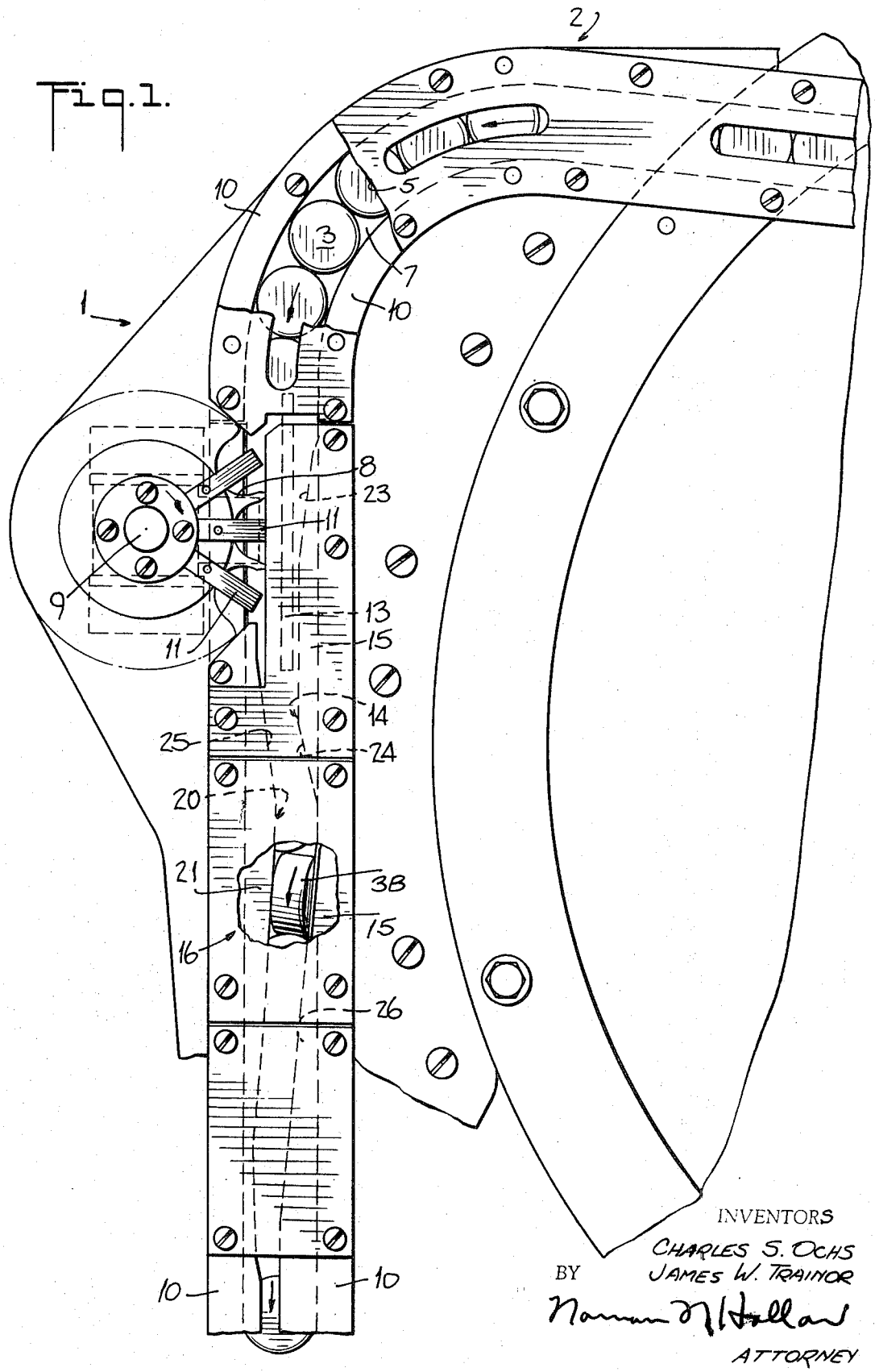
FIG. 1 is a front elevational view partially cut away of a preferred embodiment of the cap aligning mechanism in position in a cap feed chute.

FIG. 1 illustrates a preferred embodiment of the cap aligning mechanism 1 inserted in a cap chute 2 where the cap chute 2 is receiving a steady supply of randomly oriented closure caps 3 from a cap hopper 4 of other cap chute feeding means. This line of moving caps 3 passes into the hollow cap guiding chute 2 and the feed pressure forces the caps 3 to move downwardly through the chute 2 and through the cap aligning means 1. As already indicated, the line of caps 3 as fed from the hopper 4 or other feed means is randomly oriented, that is, some of the caps 3 will have their covers 6 sliding along the chute bottom 7 in an incorrectly oriented position while other caps 3 will have their covers 6 remotely positioned from the chute bottom 7 so that they are in position for being fed directly to a container sealing machine.

The incorrectly oriented caps 3, i.e. those with their covers 6 at the chute bottom 7 will be turned over or realigned by the cap aligning mechanism 1 as will now be described as the caps 3 move through the cap aligning mechanism 1. The correctly oriented caps 3 will pass into the pockets 8 of the star wheel 9 of the cap aligning mechanism 1 and will thereafter move on down the cap feeding chute 2 without having their position in the chute changed.

Above and below the cap aligning mechanism 1, the cap chute 2 has a top 5, a bottom 7, and spaced side rails 10.

Figure 2:
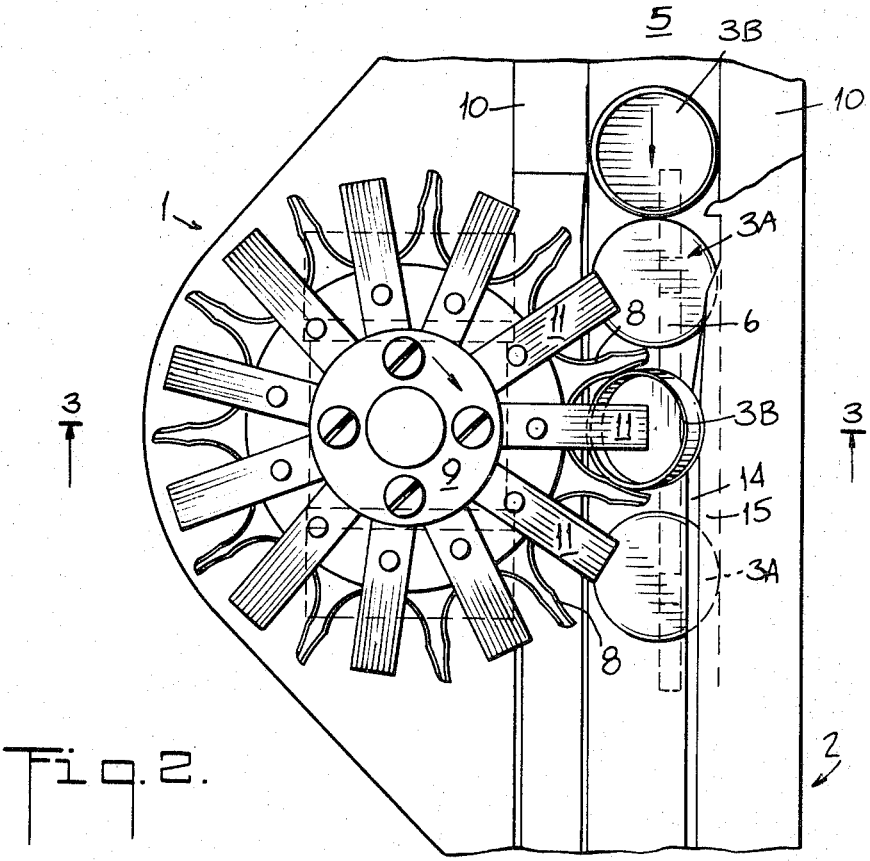
FIG. 2 is a fragmentary enlarged detailed front elevational view of a preferred embodiment of the cap aligning star wheel and adjacent chute.
Figure 3:
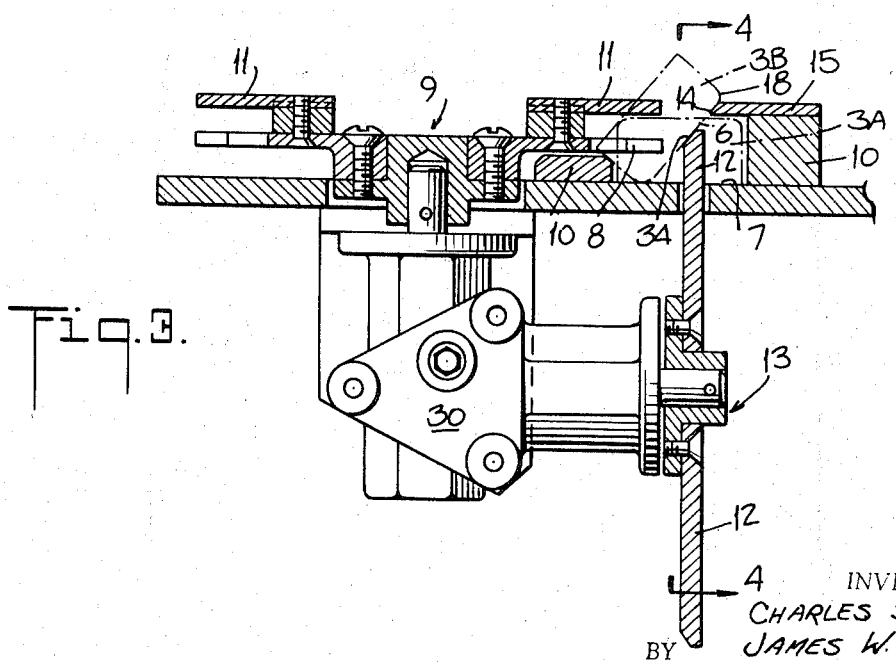
FIG. 3 is a horizontal sectional view of the star wheel of FIG. 2 taken along line 3–3 on FIG. 2.

As best seen in FIGS. 2 and 3, correctly oriented caps 3 such as the cap 3A, move into the pockets 8 of the star wheel 9 with the cap cover 6 positioned slightly below the pocket cover bar 11. In this position, the correctly oriented caps 3A will remain in the star wheel pocket 9 and the radially directed spokes 12 of the cap tilting wheel 13 mounted below and driven in synchronism with the star wheel 9 will not engage the caps 3A as they move into the cap interior in the manner illustrated for cap 3A in FIG. 4.

These correctly oriented caps 3A will thus pass into and out of the star wheel 9 and down and out of the cap feed chute 2 without having their position altered.

The incorrectly oriented caps 3B, i.e. those having their covers 6 on the chute bottom 7 will also enter the star wheel pockets 8 below the cover bars 11. These caps will be engaged as seen at 3B in FIGS. 3, 6, and 7, by the tilting arm 12 of the cap tilting wheel 13. As seen in FIGS. 3 and 4, the arms 12 on the cap tilting wheel 13 are positioned outwardly of the center line of the cap chute 2 away from the star wheel 9 so that each arm 12 will tilt the cap 3B as shown in FIG. 3. This lifts the outer edge 18 of the cap cover 6 onto a tilting rail 15 which engages the tilted cap 3B as seen in FIG. 5 as the tilted cap 3B is moved away from the star wheel 9 and out of the star wheel pocket 8 by further motion along the cap feeding chute 2. These incorrectly oriented and tilted caps 3B with their cover edges 18 resting on the cap tilting rail 15 will be moved on through the cap chute 2 by the pressure of the moving line of caps regardless of whether the succeeding cap itself has been tilted or not.

The final tilting or turn-over action necessary to completely turn over the incorrectly oriented caps 3B is provided by a cap tilting cam arrangement extending along the cap chute beyond the star wheel 9 as illustrated generally at 16 in FIG. 1. The principal portions of this tilting cam comprise the beveled edge 14 of the tilting rail 15 and turning plates 17 positioned above the chute 2 and at a decreasing distance from the chute bottom 7 so that the turning plates 17 hold the turning caps in the chute and then combine with the edge 14 of the cap tilting rail 15 for moving the cap 3B from a generally perpendicular position on the chute as seen in FIG. 8 and through the completed half turn. The cooperating action of the edge 14 of the cap tilting rail 15 and the cap turning plates 17 is shown for cap 3C in FIG. 5 as they cooperate to further tilt and lower the corner 18 of the cap 3C to the inverted and properly oriented position.

The cap tilting edge 14 of the turn-over rail 15 forms one edge of a cam slot 19 as best seen in FIG. 1 which is proportioned to accommodate and guide the raised portions of the caps 3 during the cap turn-over movement. The opposite edge 20 of the cam slot 19 is formed by a spaced turn-over rail or cover 21 on the opposite side of the chute 2.

The cover plates 17 which are positioned above the slot 19 are provided to keep the tilted caps 3 within the cap chute and the plate spacing from the chute bottom is decreased after the caps pass the half-turned position illustrated in FIG. 8 to insure that the caps continue to turn as they move along the cam slot 19.

A preferred form of the cam slot 19 as defined by its two beveled edges 14 and 20 is shown in FIG. 1.

The initial cap pick up portion 23 of edge 14 is seen to slant inwardly toward the chute center to engage the tilted caps 3B as they leave star wheel 9 and the tilting wheel 13. Opposite portions 24 and 25 of edges 14 and 20 now curve in the opposite direction to simultaneously center the cap in the chute 2 and to turn it perpendicular to the chute bottom 7.

The succeeding portions 26 of edge 14 now slants back toward the chute center to complete the cap turn-over.

The star wheel cover bars 11 are seen to provide an effective extension of the chute cover for the line of moving caps 3 as the caps 3 move into the star wheel pockets 8. This extension of the chute cover effectively keeps the correctly positioned caps in line as they move through the star wheel 9 and without any change in their orientation on the chute 2.

As illustrated in FIGS. 3, 4, and 5, however, the cover bars 11 extend over only a portion of the star wheel pockets 8 leaving the outer portions of the cap skirts uncovered and thereby permitting the improperly oriented caps 3B to be lifted or tilted by tilting wheel 13 to a suitable angle as illustrated in FIG. 3 so that the corners 18 of the caps will engage the edge 14 of the cap tilting rail 15. The cover bars 11 also cooperate in combination with the off centered cap tilting arms 12 on the cap tilting wheel 13 to insure that the incorrectly oriented caps 3B are tilted rather than merely lifted in the chute 2 as the inner portions of the bar 11 will initially engage the cap skirt during the first portion of the cap tilting action in the event it tends to lift away from the chute bottom 7.

FIGS. 3 and 4 illustrate a preferred shaping of the ends of the cap tilting spokes or arms 12 on the cap tilting wheel 13. This wheel 13 is driven in synchronism with the star wheel 9 through a right angle drive as illustrated at 30 in FIG. 3 and where the drive power for the star wheel 9 which is transmitted to the tilting wheel 13 may be provided by the feed pressure or movement of the line of caps 3 passing through the cap chute 2 and thus into the pockets 8 of the rotating star wheel 9.

As illustrated in FIG. 4, each cap tilting arm 12 has a beveled forward corner 33 to facilitate the initial contact of the arms 12 with the caps 3 to commence the tilting action and as seen in FIG. 3 has a beveled inner corner 34 to provide a firm contact for the caps 3 at the desired tilting angle when the caps are being moved against the beveled edge 14 of the cap tilting rails 15.

The turn-over operation for each incorrectly oriented cap thus comprises a first tilting action where a typical cap such as one with the proportions generally as illustrated, is first tilted to an acute angle in the star wheel pocket 8 by the action of the tilting arms 12 of the cap tilting wheel 13. Thereafter, the cap is further tilted by the action of the beveled edge 14 of the cap tilting rail 15 so that the cap is first turned generally perpendicularly to the bottom 7 of the cap chute 2. Now the final quarter turn is obtained by the further action of the beveled edges 14 and 20 forming the cam slot 19 between cap tilting rails 15 and 21. The cover plates 17 keep the caps in line in the chute 2 during the tilting and have a decreasing spacing from the chute bottom 7 to assure the final quarter turn resulting in a correctly oriented cap.

It will be seen that an improved cap aligning mechanism has been provided which is useful on all types of caps whether made of ferrous or non-ferrous metal or plastic or other material. The cap sensing and aligning action is also of a positive nature which permits the aligning action to be performed at extremely high speeds. The combination of the tilting wheel with the star wheel pockets and radial cover bars also permits a positive aligning operation to be obtained with caps of relatively small diameter and particularly those caps having relatively deep skirts as contrasted with the cap diameter. The cap aligning mechanism in accordance with the present invention also is particularly useful for high speed feeding operations as it operates on a moving continuous line of caps and as there is no diversion of caps back to the cap feeding hopper.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A mechanism for inverting improperly oriented caps in a moving line of randomly oriented caps comprising the combination of a rotatably mounted star wheel having a plurality of cap receiving pockets, a cap feed chute for feeding caps into and out of the star wheel pockets, means consisting of a single cap tilting wheel positioned below said pocket for tilting improperly oriented caps in the star wheel pockets, means for rotating said wheels in synchronism with each other, and cam means on said chute beyond said star wheel for engaging and further turning the tilted caps.

2. The mechanism as claimed in claim 1 which further comprises radially oriented cover members on said star wheel positioned above the star wheel pockets and covering only a portion of the pockets.

3. The mechanism as claimed in claim 1 which further comprises cover members for said star wheel pockets having a radially outwardly open portion whereby the radially outward portions of improperly oriented caps are raised in the star wheel pockets by the cap tilting wheel.

4. The mechanism as claimed in claim 1 in which said cam means extends generally longitudinally of said chute and comprises means for tilting the caps to a position generally perpendicular to the chute bottom, means for moving the perpendicularly positioned caps laterally of the chute, and means for thereafter further turning the caps.

5. The mechanism as claimed in claim 1 which further comprises cover plates positioned above said cam means and having a decreasing spacing from the chute bottom in the direction of cap travel.

6. The mechanism as claimed in claim 1 in which the cap tilting wheel has arms having a first relatively flat cap engaging surface aligned generally parallel to the chute bottom for the arm position where the arms first engage the cap covers, and a second relatively flat cap engaging surface aligned generally parallel to the fully tilted position of the cap covers in the star wheel pockets.

7. A mechanism for inverting improperly oriented caps in a moving line a randomly oriented caps comprising the combination of a rotatably mounted star wheel having cap receiving pockets, a cap feed chute positioned for directing the caps in a moving line of caps into pockets of the star wheel and for thereafter receiving the caps from the pockets of the star wheel, means consisting of a single cap tilting wheel having a plurality of cap tilting arms positioned to project through the bottom of said chute into the star wheel pockets, means for rotating said star wheel and cap tilting wheel in synchronism whereby the cap tilting arms engage the covers of improperly positioned caps for tilting them in the star wheel pockets, and an elongated cam means in said chute beyond said star wheel for further turning the tilted caps.

8. The mechanism as claimed in claim 7 which further comprises radially oriented cover members on said star wheel positioned above the star wheel pockets and covering only a portion of the pockets.

9. The mechanism as claimed in claim 7 which further comprises cover members for said star wheel pockets having a radially outwardly open portion whereby the radially outward portions of improperly oriented caps are raised in the star wheel pockets by the cap tilting wheel.

10. The mechanism as claimed in claim 7 in which said cam means extends generally longitudinally of said chute and comprises means for tilting the caps to a position generally perpendicular to the chute bottom, means for moving the perpendicularly positioned caps laterally of the chute, and means for thereafter further turning the caps.

11. The mechanism as claimed in claim 7 which further comprises cover plates positioned above said cam means and having a decreasing spacing from the chute bottom in the direction of cap travel.

12. The mechanism as claimed in claim 7 in which the cap tilting arms have a first relatively flat cap engaging surface aligned generally parallel to the chute bottom for the arm position where the arms first engage the cap covers, and a second relatively flat cap engaging surface aligned generally parallel to the fully tilted position of the cap covers in the star wheel pockets.

13. The mechanism as claimed in claim 7 wherein said star wheel is freely mounted for rotation by caps in the moving line of caps, and said means for rotating said wheels in synchronism comprises an operative connection therebetween.

14. A mechanism for inverting improperly oriented caps in a moving line of randomly oriented caps comprising the combination of a rotatably mounted pocket wheel, a cap feed chute positioned for directing a moving line of caps into pockets of the pocket wheel and for thereafter receiving the caps from the pockets of the pocket wheel, means consisting of a single cap tilting wheel having a plurality of cap tilting arms positioned to project through the bottom of said chute into the pocket wheel pockets, means for rotating said pocket wheel and cap tilting wheel in synchronism with one another whereby the cap tilting arms enter into the pocket wheel pockets for engaging the covers of the improperly positioned caps for tilting them in the wheel pocket, radially oriented cover members positioned above the pocket wheel pockets and covering only a portion of the pockets, and cam means beyond said pocket wheel for further turning the tilted caps.

15. A mechanism for inverting improperly oriented caps in a moving line of randomly oriented caps comprising the combination of a rotatably mounted star wheel having cap receiving pockets, radially oriented cover members on said star wheel positioned above the star wheel pockets and covering only a central portion of the pockets, said pockets having a radially outwardly positioned open portion, a cap feed chute positioned for directing the caps in a moving line of caps into pockets of the star wheel and for thereafter receiving the caps from the pockets of the star wheel, means consisting of a single cap tilting wheel having members positioned to project through the bottom of said chute into the star wheel pockets, means for rotating said star wheel and said cap tilting wheel in synchronism whereby the cap tilting members engage the covers of improperly positioned caps for tilting them in the star wheel pockets against said cover members, and elongated cam means running longitudinally in said chute for tilting the caps to a position generally perpendicular to the chute bottom, means for moving the perpendicularly positioned caps laterally of the chute, and cam means for thereafter further turning the caps in said chute.